Jan. 30, 1945. W. E. ROGERS 2,368,570
STUD BOLT GUARD
Filed May 22, 1944
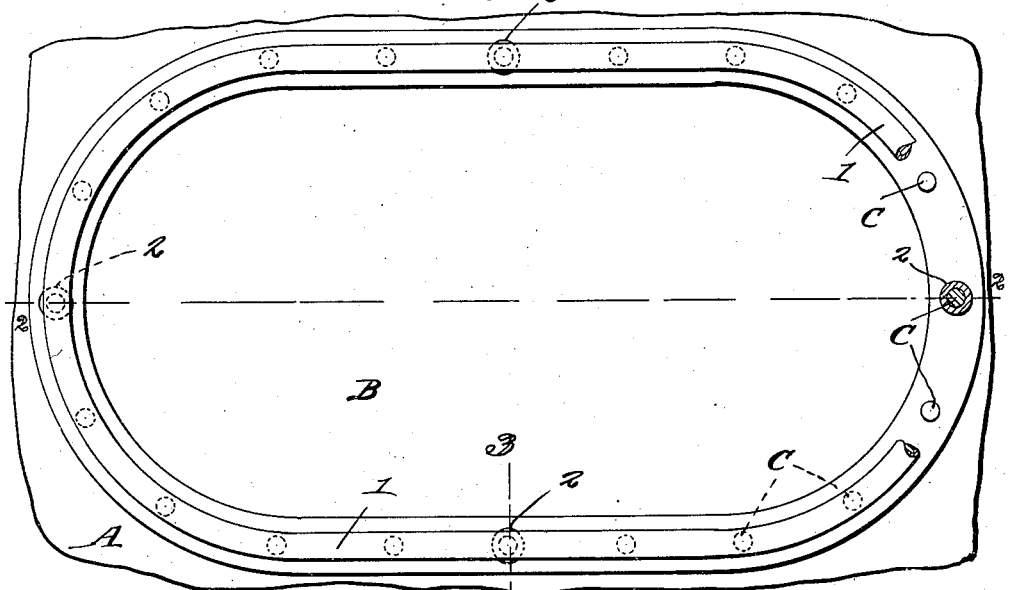
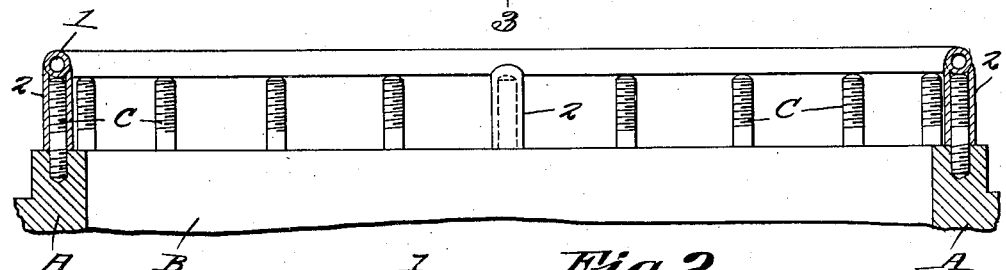
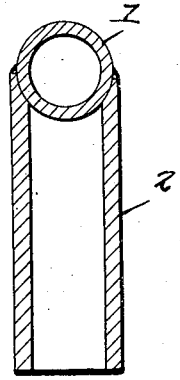
W. E. Rogers
INVENTOR.
BY
*Ch. Snowles*
ATTORNEYS.

Patented Jan. 30, 1945

2,368,570

UNITED STATES PATENT OFFICE 2,368,570

STUD BOLT GUARD

William Eaber Rogers, Beaumont, Tex.

Application May 22, 1944, Serial No. 536,786

3 Claims. (Cl. 16—108)

This invention relates to a guard designed for use in connection with stud bolts provided for manhole covers. While ships are under construction for repair, these stud bolts frequently are damaged to such an extent as to require replacement and, consequently, waste of time and materials. The projecting bolts also endanger workmen entering or leaving the manhole.

An object of the present invention is to provide a guard adapted to be placed temporarily over these stud bolts so that they will be protected from injury and, at the same time, cannot injure persons passing through the manhole.

Another object is to provide a guard which is simple in construction and can be easily applied and removed.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a plan view of the guard applied to a series of stud bolts extending about a manhole, a portion of the guard being broken away.

Figure 2 is a section on line 2—2, Figure 1.

Figure 3 is an enlarged section on line 3—3, Figure 1.

Referring to the figures by characters of reference, A designates a structure provided with a manhole B and extending outwardly from this structure is a series of stud bolts C placed about the manhole where they can be engaged properly by a manhole cover. The structure thus far described is common to ship construction. Obviously when the manhole cover is removed, the projecting stud bolts are exposed where they can cause injury to persons passing through the manhole and where they can be damaged by objects coming forcibly thereagainst. To obviate these undesirable features, the present invention has been devised. It includes a guard rail 1 which can be made of heavy pipe and proportioned to rest upon the ends of all of the stud bolts when properly assembled therewith. At desired points, sleeves 2 are joined to this rail and are extended downwardly therefrom, each of these sleeves being proportioned to receive one of the stud bolts and to bear upon the structure A from which the bolt extends. The internal diameter of each sleeve is slightly greater than that of the stud bolts so that the sleeve can easily be slipped onto or off of a stud bolt without damaging the threads.

Obviously with the guard in position, workmen can pass through the manhole without danger of being injured by the studs and, furthermore, the studs will be protected from injury by objects dropping thereon or coming forcibly thereagainst. Any desired number of these sleeves can be used, it merely being essential that they be so positioned relative to each other as to slip readily onto the selected stud bolts.

What is claimed is:

1. The combination with a structure having a manhole and stud bolts extending from the structure adjacent to the manhole, of a guard for the stud bolts including an endless rail proportioned to rest upon all of the stud bolts, and bolt-receiving sleeves carried by the rail.

2. The combination with a structure having a manhole, and a series of stud bolts extending from the structure adjacent to the manhole, of a guard comprising a tubular rail, said rail being proportioned to rest upon all of the bolts, and bolt-receiving sleeves integral with and extending from the rail and proportioned for engagement with the structure, thereby to support the rail.

3. A one-piece guard for stud bolts including a guard rail and a plurality of sleeves extending in one direction from the guard rail and fixed relative thereto, said sleeves being proportioned to slide simultaneously onto a plurality of stud bolts when applied thereto.

WILLIAM EABER ROGERS.